(12) United States Patent
Han et al.

(10) Patent No.: US 10,466,894 B2
(45) Date of Patent: Nov. 5, 2019

(54) METHOD, DEVICE, STORAGE MEDIUM AND MOBILE TERMINAL FOR RECOGNIZING AN OFF-SCREEN GESTURE

(71) Applicant: GUANGDONG OPPO MOBILE TELECOMMUNICATIONS CORP., LTD., Dongguan, Guangdong (CN)

(72) Inventors: Tong Han, Dongguan (CN); Mingqiang Guo, Dongguan (CN); Rendong Shi, Dongguan (CN); Hao Wang, Dongguan (CN); Qiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/002,375

(22) Filed: Jun. 7, 2018

(65) Prior Publication Data

US 2019/0034071 A1    Jan. 31, 2019

(30) Foreign Application Priority Data

Jul. 28, 2017    (CN) .......................... 2017 1 0633673

(51) Int. Cl.
*G06F 3/0488* (2013.01)
*G06F 3/0484* (2013.01)
*H04M 1/725* (2006.01)

(52) U.S. Cl.
CPC ........ *G06F 3/04883* (2013.01); *G06F 3/0484* (2013.01); *G06F 3/04886* (2013.01); *H04M 1/72563* (2013.01); *H04M 2250/22* (2013.01)

(58) Field of Classification Search
CPC ............... G06F 3/0484; G06F 3/04883; G06F 3/04886; H04M 1/72563; H04M 2250/22
See application file for complete search history.

(56) References Cited

U.S. PATENT DOCUMENTS

2012/0176322 A1    7/2012  Karmi
2013/0326395 A1    12/2013 Oh
(Continued)

FOREIGN PATENT DOCUMENTS

CN    105183352 A    12/2015
CN    105354474 A     2/2016
(Continued)

OTHER PUBLICATIONS

Supplementary European Search Report in European application No. 18177523.0, dated Jan. 2, 2019.
(Continued)

*Primary Examiner* — Stacy Khoo
(74) *Attorney, Agent, or Firm* — Ladas & Parry, LLP

(57) ABSTRACT

Embodiments provide a method, device, storage medium and mobile terminal, for recognizing an Off-screen gesture. The method includes: upon reception in a driver layer of an Off-screen gesture input by a user, determining whether each of preset Off-screen gestures is switched on based on an Off-screen gesture switch that switches on or off the preset Off-screen gesture in the driver layer; matching an switched-on Off-screen gesture with an Off-screen gesture in a preset confusable gesture group, and determining to change a recognition condition for the switched-on Off-screen gesture when the matching indicates there is only one Off-screen gesture in the on state in the confusable gesture group; and when determining to change the recognition condition, replacing, with a preset second recognition condition, a first recognition condition for the switched-on Off-screen gesture in the driver layer, and recognizing a gesture type of the input Off-screen gesture with the second recognition condition.

20 Claims, 11 Drawing Sheets

(56) References Cited

U.S. PATENT DOCUMENTS

2015/0058651 A1  2/2015  Choi et al.
2015/0264169 A1  9/2015  Yim et al.

FOREIGN PATENT DOCUMENTS

CN   107391021 A   11/2017
EP     2919108 A1    9/2015

OTHER PUBLICATIONS

International Search Report in international application No. PCT/CN2018/090016, dated Sep. 5, 2018.
Written Opinion of the International Search Authority in international application No. PCT/CN2018/090016, dated Sep. 5, 2018.

METHOD, DEVICE, STORAGE MEDIUM AND MOBILE TERMINAL FOR RECOGNIZING AN OFF-SCREEN GESTURE

CROSS-REFERENCE TO RELATED APPLICATION

The present application claims benefit of Chinese Patent Application 201710633673.4, filed on Jul. 28, 2017, the contents of which are hereby incorporated by reference in its entirety.

TECHNICAL FIELD

Embodiments of the present disclosure relate to a mobile terminal technology, and more particularly to a method, device, storage medium and mobile terminal, for recognizing an Off-screen gesture.

BACKGROUND

An existing mobile terminal such as a smart phone, a palmtop computer, a tablet computer or a handheld game console, is usually provided with a touch screen to enable touch inputting, which facilitates an operation of a user.

An Off-screen gesture function of an existing smart phone is distinguishing, which can provide a sense of future science and technology. When the Off-screen gesture function is switched-on, a screen gesture operation may be implemented even in a standby Off-screen state of the smart phone, to trigger a corresponding function or software in the phone. However, in practice, when a user inputs an Off-screen gesture, he/she may freely draw the gesture to be input on a touch screen, which often causes misjudgment of Off-screen gestures. Therefore, a mobile terminal may execute operations corresponding to undesired Off-screen gestures or may not execute any operation.

In view of the above discussed technical problem in the existing Off-screen gesture function, it is desired to propose a corresponding solution.

SUMMARY

The embodiments of the present disclosure provide a method, device, a storage medium and a mobile terminal for recognizing an Off-screen gesture, which may improve an Off-screen gesture recognition rate.

On a first aspect, the embodiments of the disclosure provide a method for recognizing an Off-screen gesture. The method may include the following actions.

Upon reception in a driver layer of an Off-screen gesture input by a user, whether each of preset Off-screen gestures is switched on based on an Off-screen gesture switch that switches on or off the preset Off-screen gesture in a driver layer.

A switched-on Off-screen gesture is matched with an Off-screen gesture in a preset confusable gesture group, and a recognition condition for the switched-on Off-screen gesture is determined to be changed when a result of the matching indicates that there is only one Off-screen gesture in the on state in the confusable gesture group to which the Off-screen gesture belongs.

When determining to change the recognition condition for the switched-on Off-screen gesture, a first recognition condition for the switched-on Off-screen gesture in the driver layer is replaced with a preset second recognition condition, and a gesture type of the Off-screen gesture input by the user is recognized according to the second recognition condition.

On a second aspect, the embodiments of the disclosure provide a computer-readable storage medium, on which a computer program may be stored, the program being executed by a processor to implement the method for recognizing an Off-screen gesture of the embodiments of the disclosure.

On a third aspect, the embodiments of the disclosure further provide a mobile terminal, which may include a memory, a processor and a computer program stored on the memory and capable of running on the processor, the processor executing the computer program to implement the method for recognizing an Off-screen gesture of the embodiments of the disclosure.

DETAILED DESCRIPTION

Figure 1:
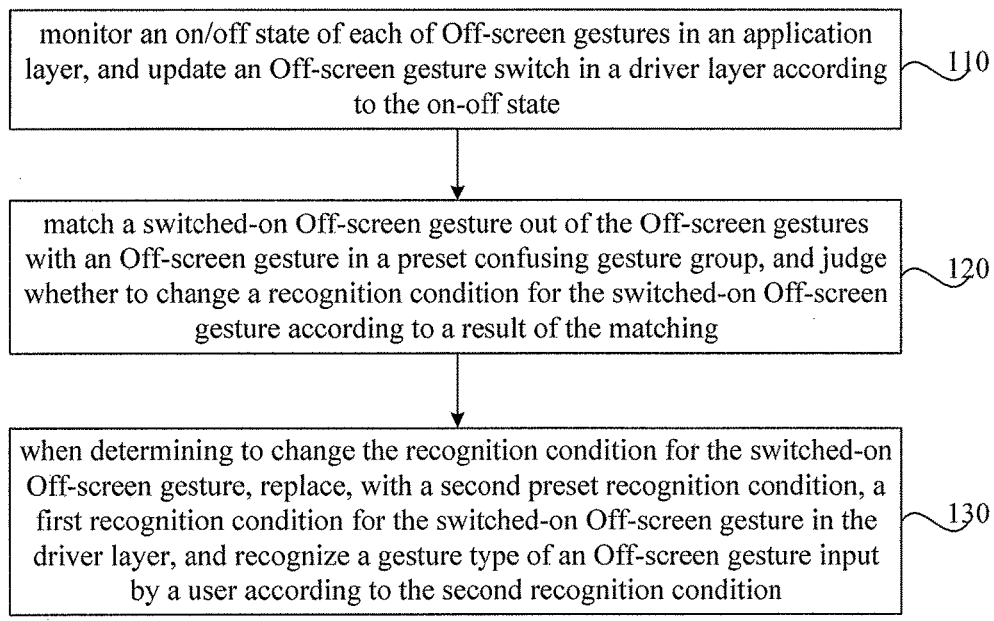
FIG. 1 illustrates a flowchart of a method for recognizing an Off-screen gesture according to an embodiment of the disclosure.

The present disclosure will further be described below in combination with the drawings and the embodiments in detail. It can be understood that the specific embodiments described here are adopted not to limit the disclosure but only to explain the disclosure. In addition, it is should be noted that, for convenient description, not all but only part of related structures of the disclosure are shown in the drawings.

Before exemplary embodiments are discussed in more detail, it should be mentioned that some exemplary embodiments are described into processing or methods described in the flowcharts. Although each action in the flowcharts is described into sequential processing, many actions therein may be implemented in parallel, concurrently or at the same time. In addition, a sequence of each action may be rearranged. When operations are completed, the processing may be terminated, but additional actions not included in the drawings may further be executed. The processing may correspond to a method, a function, a procedure, a subroutine, a subprogram and the like.

An Off-screen gesture function refers to the following function. In case that a mobile terminal (e.g., a smartphone) is in an Off-screen dormant state, a touch screen of the mobile terminal is operated with a low power consumption to detect an Off-screen gesture acting on the touch screen in the Off-screen state. Then, according to the Off-screen gesture, a function of the smart phone is awakened or a preset application corresponding to the Off-screen gesture is switched-on. In the following, for conveniently understanding the Off-screen gesture function, a flow from detection of the Off-screen gesture in the Off-screen state to enabling of the application program corresponding to the Off-screen gesture in an application layer will be described below. This flow includes the following actions. Gesture data corresponding to the Off-screen gesture is stored in a preset node of a driver layer, where the gesture data includes gesture coordinates and a gesture type. For example, the gesture type may be a pattern. The driver layer judges whether the data of the Off-screen gesture is valid. When the data of the Off-screen gesture is judged to be valid, a framework layer dispatches an Off-screen gesture event. The application layer reads, from the preset node in the driver layer, the gesture data upon reception of the Off-screen gesture event. The application layer calculates a motion trail of the Off-screen gesture according to the gesture coordinate and the gesture type, and sends data of the motion trail to a FrameBuffer, and display the motion trail on the display screen with a set screen refresh rate. Then, the application layer enables the application corresponding to the gesture type.

In the execution flow of the Off-screen gesture, the Off-screen gesture is detected in the Off-screen state, which triggers reporting the Off-screen gesture event to the application layer. Then the application layer enables the application corresponding to the Off-screen gesture. However, due to large arbitrariness of manual input of an Off-screen gesture by a user, some gestures with similar characteristics in the driver layer are likely to be misrecognized. For example, "O" input by the user is recognized to be an Off-screen gesture "V" which is not desired by the user. At this point, the driver layer does not report any Off-screen gesture event, resulting in that the Off-screen gesture input by the user is not responded. An Off-screen gesture recognition solution provided by the embodiments of the disclosure may well solve the problem of low Off-screen gesture recognition rate.

FIG. 1 is a flowchart of a method for recognizing an Off-screen gesture according to an embodiment of the disclosure. The method may be executed by a device for recognizing an Off-screen gesture. The device may be implemented by software and/or hardware, and may usually be integrated in a mobile terminal. As shown in FIG. 1, the method includes the following actions.

In S110, an on/off state of each of Off-screen gestures in an application layer is monitored, and an Off-screen gesture switch in a driver layer is updated according to the on/off state.

The Off-screen gesture may be a touch gesture input by a user on a touch screen of the mobile terminal in an Off-screen state in case that an Off-screen gesture function is switched-on. It should be understood that the Off-screen gesture is not limited to a touch gesture input on the touch screen. For example, the Off-screen gesture may also be holding the mobile terminal to make a circle in a space to represent input of an Off-screen gesture "O".

A switch controlling whether to switch on the Off-screen gesture is preset in an application layer and a driver layer. The Off-screen gesture switch may be shown as a switch control which is used by the user to enable or disable the Off-screen gesture corresponding to the Off-screen gesture switch. For example, when the user clicks an Off-screen gesture function option in setting, a display interface is switched to an Off-screen gesture interface. The Off-screen gesture interface includes the preset Off-screen gestures (for example, "O", "V", "<", "W" and "M") and the corresponding Off-screen gesture switches, and further includes an Off-screen gesture customization option. When the user switches on the Off-screen gesture switch corresponding to the Off-screen gesture "O", it is indicated that the Off-screen gesture "O" is switched-on. At this point, a return value of the switch control corresponding to the Off-screen gesture "O" is changed into a preset value corresponding to enabling the Off-screen gesture (for example, a return value 1 represents enabling the Off-screen gesture). The preset value may be set by an application developer.

As an example, the application layer monitors the return value of the switch control corresponding to each of Off-screen gestures in the Off-screen gesture interface. The on/off state of the Off-screen gesture in the application layer is determined according to the return value of the switch control. When the user changes an on/off state of an Off-screen gesture switch in the application layer, the application layer updates the Off-screen gesture switch in the driver layer according to the on/off state of the Off-screen gesture, to enable the driver layer to judge whether the Off-screen gesture is switched-on upon detection of the Off-screen gesture. When the Off-screen gesture is judged to not be switched-on, no Off-screen gesture event is reported. In this case, the mobile terminal determines that the Off-screen gesture is an invalid gesture and gives no response to the Off-screen gesture. In such a manner, reporting an Off-screen gesture event that is triggered by an invalid Off-screen gesture, may be effectively avoided, so that the application layer is prevented from executing an invalid operation of reading gesture data from a preset node of the driver layer upon reception of the Off-screen gesture event triggered by the invalid Off-screen gesture to be reported. Thus, processing resource waste of the mobile terminal is avoided. For example, the user enables the Off-screen gesture function and enables the Off-screen gestures "O", "V" and "W". At this point, the application layer detects that the return values of the switch controls of the Off-screen gesture switches corresponding to the Off-screen gestures "O", "V" and "W" are changed. An operation of switching on the Off-screen gesture switches of the Off-screen gestures "O", "V" and "W" by the user triggers the application layer to execute an operation of synchronizing states of the Off-screen gesture switches to the driver layer. For example, the application layer issues the on/off states of the Off-screen gesture switches of the Off-screen gestures "O", "V" and "W". The driver layer receives the on/off states and synchronously switches on the Off-screen gesture switches of the Off-screen gestures "O", "V" and "W" in the driver layer according to the on/off states. When the user inputs the Off-screen gesture "O", the driver layer reports an Off-screen gesture event after recognizing the Off-screen gesture. However, when the user inputs the Off-screen gesture "M", the driver layer, after recognizing the Off-screen gesture, determines that it is an invalid gesture and does not report the Off-screen gesture, so that reporting of an Off-screen gesture event for an Off-screen gesture which is not switched on to the application layer is avoided.

In S120, a switched-on Off-screen gesture is matched with an Off-screen gesture in a preset confusable gesture group, and whether to change a recognition condition for the switched-on Off-screen gesture is determined according to a result of the matching.

The confusable gesture group is a set of Off-screen gestures which are misrecognized by the mobile terminal after the user normally inputs the Off-screen gestures. The confusable gesture group may be fixed, and may also be customized according to a using habit of the user, and there may be many specific determination manners for the confusable gesture group. For example, the confusable gesture group may be determined by investigation of a manufacturer of the mobile terminal over Off-screen gestures which are likely to be misrecognized when a user group uses Off-screen gestures for statistical analysis about misrecognition rates of the Off-screen gestures, and is preset in the mobile terminal before the mobile terminal is delivered. For another example, the user may also enter an Off-screen gesture calibration function before starting using the screen-of gesture function of the mobile terminal. The user inputs an Off-screen gesture, and the mobile terminal, after recognizing the Off-screen gesture, displays a recognition result on a display screen and inquires the user whether it is correctly recognized. For example, for the Off-screen gestures "O" and "V", the user inputs the Off-screen gesture "O", but the mobile terminal recognizes the Off-screen gesture in "V" due to a non-standard writing habit of the user. After finishing recognition, the mobile terminal displays an inquiry interface to inquire the user whether the Off-screen gesture input just now is "V". The confusable Off-screen gestures for the user are determined according to response information input by the user, and these confusable Off-screen gestures form the confusable gesture group.

Whether the switched-on Off-screen gesture belongs to the confusable gesture group is judged. When it is judged that the switched-on Off-screen gesture belongs to the confusable gesture group, whether Off-screen gesture switches corresponding to other Off-screen gestures in the confusable gesture group including the switched-on Off-screen gesture are switched on is judged. When all of the other Off-screen gestures in the confusable gesture group including the switched-on Off-screen gesture are not switched on, the recognition condition for the switched-on Off-screen gesture is determined to be changed. Thereby, the recognition condition for the switched-on Off-screen gesture is regulated according to a condition of an Off-screen gesture configuration made by the user, and thus occurrence of the condition of partial confusing of Off-screen gestures with similar characteristics in the driver layer may be avoided. When the switched-on Off-screen gesture does not belong to any confusable gesture group, the recognition condition for the switched-on Off-screen gesture is determined not to be changed. In at least one embodiment, when the switched-on Off-screen gesture belongs to the confusable gesture group and at least one of the other Off-screen gestures in the confusable gesture group is in an on state, the recognition condition for the switched-on Off-screen gesture is determined not to be changed.

In S130, when determining to change a recognition condition for the switched-on Off-screen gesture, a first recognition condition for the switched-on Off-screen gesture in the driver layer is replaced with a present second recognition condition, and a gesture type of an Off-screen gesture input by a user is recognized according to the second recognition condition.

Exemplarily, the first recognition condition may be that a number of pixels between a starting point and a terminal point of the Off-screen gesture does not exceed a first number. The second recognition condition may be that the number of the pixels between the starting point and terminal point of the Off-screen gesture does not exceed a second number, the second number being larger than the first number. It can be understood that the recognition condition may be determined according to a trail characteristic of the Off-screen gesture, and is not limited to the manners listed above. For example, the recognition condition may also be determined according to a number of turning points and a position relationship between the turning points. For the Off-screen gesture "W" and the Off-screen gesture "M", the recognition condition may be that the gesture of which a number of turning points exceeds a set number threshold value and a longitudinal coordinate of the first turning point is smaller than a longitudinal coordinate of the second turning point is the Off-screen gesture "W", otherwise is the Off-screen gesture "M".

When a requirement of changing the recognition condition for the switched-on Off-screen gesture is met, the driver layer adopts the changed recognition condition to recognize the gesture type of the Off-screen gesture input by the user. Exemplarily, after the user inputs the Off-screen gesture, the driver layer acquires gesture data of the Off-screen gesture and performs curve fitting to calculate a gesture type closest to the input Off-screen gesture according to gesture coordinates included in the gesture data. Whether the gesture type is a final gesture type corresponding to the Off-screen gesture input by the user is further judged by adopting the changed second recognition condition. For example, the closest gesture type is "O" is preliminarily determined in a curve fitting manner. Since "O" belongs to a confusable gesture pair (including "O" and "V"), when the user does not switch the Off-screen gesture "V" at this point, it is determined that a recognition condition for the Off-screen gesture "O" is required to be changed. The recognition condition may be that a number of pixels between a starting point and a terminal point of a motion trail of the Off-screen gesture does not exceed a set number. At this point, a number of pixels between a starting point and a terminal point of a motion trail of the Off-screen gesture preliminarily recognized into "O" is acquired. When pixel data does not exceed the set number (the set number is determined by characteristics of different Off-screen gestures), it is determined that the Off-screen gesture is "O". Since the Off-screen gesture switch corresponding to the Off-screen gesture "O" in the driver layer is in the on state, the driver layer reports an Off-screen gesture event to the application layer for the application layer to execute a function corresponding to the Off-screen gesture "O".

Figure 2:
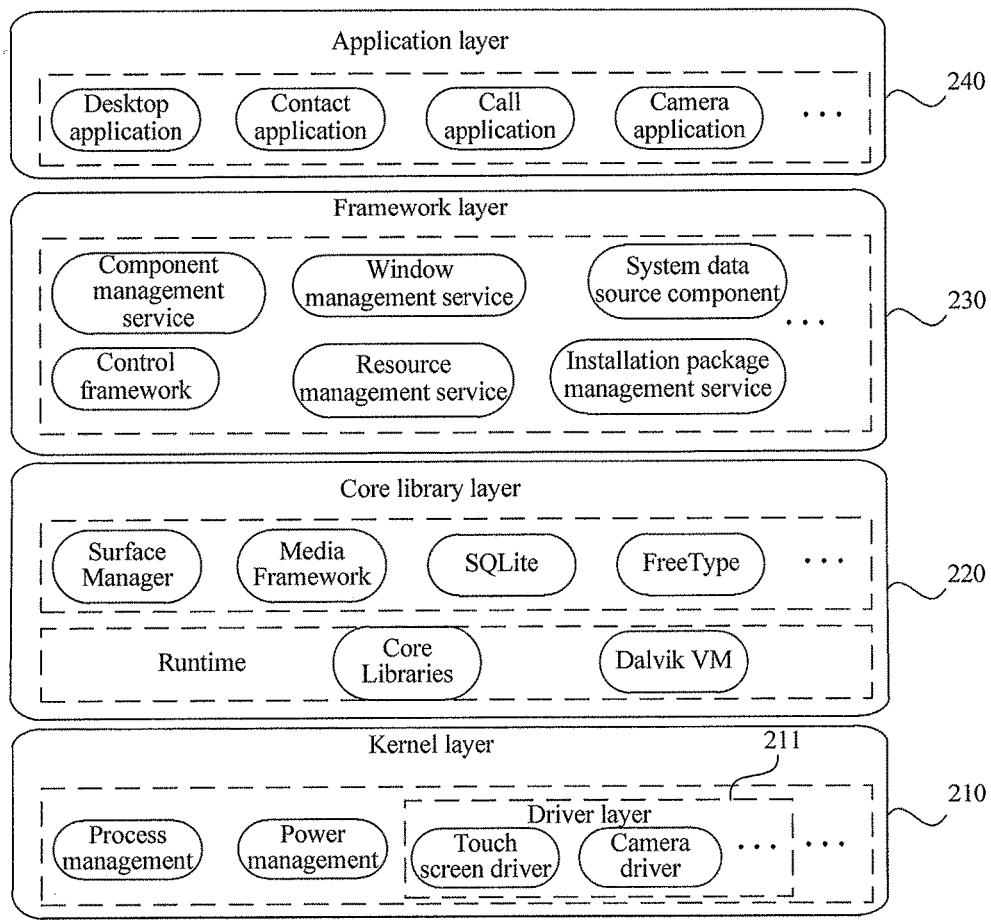
FIG. 2 illustrates a framework diagram of an Android system according to an embodiment of the disclosure.

FIG. 2 is a framework diagram of an Android system according to an embodiment of the disclosure. An execution flow of an Off-screen gesture function provided by the embodiment of the disclosure is introduced with a mobile terminal of which an operating system is an Android system in FIG. 2. As shown in FIG. 2, a framework of the Android system includes a kernel layer 210, a core library layer 220, a framework layer 230 and an application layer 240 from bottom to top. The kernel layer 210 provides core system service such as security, memory management, process management, a network protocol stack, a hardware driver and the like. The hardware driver in the kernel layer 210 is recorded as a driver layer 211, and the driver layer 211 includes a touch screen driver, a camera driver and the like. The core library layer 220 includes Android Runtime and Libraries. The Android Runtime provides most of functions available in Java programming language core libraries, including Core libraries and a Dalvik Virtual Machine (VM). Each Android application program is an example in the Dalvik VM and runs in its own process. The libraries are used for each component of the Android system and include the following functions: a Media Framework, a Surface Manager, an SQLite (relational database engine), FreeType (bitmap and vector font rendering) and the like, and each function is exposed to developers for use through the framework layer 230 of the Android system. The framework layer 230 provides a series of libraries required by development of the Android application programs to enable the developer to rapidly develop the application programs, conveniently reuse the components and implement personalized extension by inheritance, and provides service including component management service, window management service, a system data source component, a spatial framework, resource management service, installation package management service and the like. The application layer 240 includes various kinds of application programs directly interacting with a user or service programs written with a Java language and running in background, including programs such as a desktop application, a contact application, a call application, a camera application, a picture viewer, a game, a map and a web browser and other application programs developed by the developers.

Exemplarily, after the Off-screen gesture function is switched-on, a touch chip generates a wakeup signal when detecting an Off-screen gesture, and sends the wakeup signal to the kernel layer. The kernel layer is triggered by the wakeup signal to execute a system wakeup operation. After the system is woken up, the kernel layer calls an interruption function of the driver layer to execute an operation of reading gesture data in the touch chip and stores the read gesture data in a preset node of the driver layer. The preset node may be a file node, and for example, may be a virtual file node under a proc-D directory. After data reading is completed, the driver layer determines validity of the gesture data. There are many manners for determining the validity, which will not be specifically limited in the embodiment. For example, the driver layer determines a gesture type according to gesture coordinates included in the gesture data and stores the determined gesture type in the preset node as the gesture data. When the gesture type is not a preset Off-screen gesture, it is determined that the gesture data is invalid. For another example, the driver layer counts the gesture data, determines whether an amount meets a requirement of drawing the preset Off-screen gesture (i.e., a switched-on gesture), and if NO, determines that the gesture data is invalid. When the data is valid, the driver layer reports an Off-screen gesture event. The Off-screen gesture event is issued to the framework layer through the core library layer, and is dispatched to the application layer through the framework layer. The application layer reads the gesture data from the preset node of the driver layer when acquiring the Off-screen gesture event. After the gesture data is completely prepared, an Off-screen gesture trail is calculated according to the gesture coordinate included in the gesture data, and the Off-screen gesture trail is drawn on a display screen for display. Then, the application layer starts an application program corresponding to the gesture type on the basis of the gesture type in the read gesture data, where the gesture type may be a preset gesture configured to realize a certain function in the mobile terminal, and may also be a user-defined gesture. For example, the gesture type may be O and represents starting of a camera. For example, the gesture type may be V and represents starting of a flashlight and the like.

It can be understood that the execution flow of the Off-screen gesture function is not limited to the manner listed in the embodiment. For example, the Off-screen gesture event may also be reported when the system is woken up. The kernel layer calls the interruption function of the driver layer to execute the operation of reading the gesture data in the touch chip and stores the gesture data in the preset node of the driver layer. When the Off-screen gesture event is reported, operations of reading the gesture data from the driver layer and determining the gesture type according to the gesture data are executed in parallel. For example, the driver layer acquires the gesture data in the preset node, performs curve fitting on the gesture data to obtain a gesture type closest to the Off-screen gesture and also stores the gesture type in the preset node as gesture data. Upon reception of the Off-screen gesture event, the application layer detects whether the gesture data in the preset node is completely prepared according to a set period. When it is completely prepared, the application layer reads the gesture data from the preset node. When the gesture data is successfully read and is valid, the Off-screen gesture trail is calculated according to the gesture coordinate included in the gesture data, and the Off-screen gesture trail is drawn on the display screen for display. Then, the application layer starts the application program corresponding to the gesture type on the basis of the gesture type in the read gesture data.

According to the technical solution of the embodiment of the disclosure, the on/off state of each of Off-screen gestures in the application layer is monitored. An Off-screen gesture switch in the driver layer is updated according to the on/off state. The switched-on Off-screen gesture is matched with an Off-screen gesture in a preset confusable gesture group. Whether to change the recognition condition for the switched-on Off-screen gesture is judged according to the result of the matching. When determining to change the recognition condition for the switched-on Off-screen gesture, the first recognition condition for the switched-on Off-screen gesture in the driver layer is replaced with the preset second recognition condition, and the gesture type of the Off-screen gesture input by the user is recognized according to the second recognition condition. According to the technical solution, no response is required to be given to an Off-screen gesture which is not switched-on according to Off-screen gesture configuration made by the user, and moreover, the recognition condition for the switched-on Off-screen gesture may be pertinently regulated, so that occurrence of the condition of low Off-screen gesture recognition rate existing at present may be effectively avoided, and the gesture recognition rate is increased.

Figure 3A:
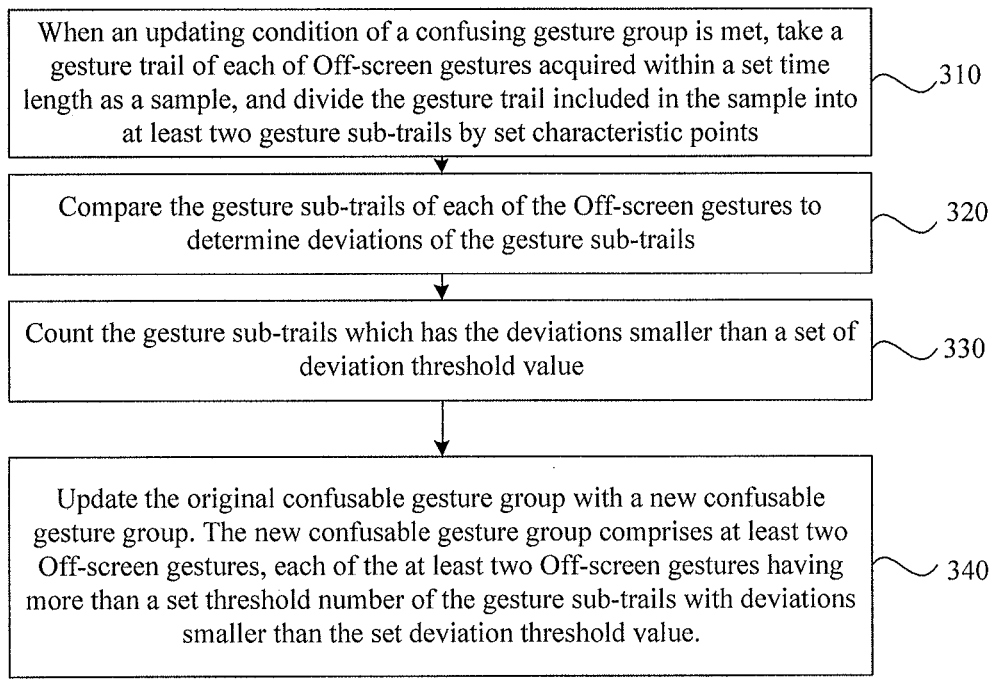
FIG. 3a illustrates a flowchart of a method for updating a confusable gesture group according to an embodiment of the disclosure.

FIG. 3a is a flowchart of a method for updating a confusable gesture group according to an embodiment of the disclosure. As shown in FIG. 3a, the method includes the following actions.

In S310, when an updating condition of the confusable gesture group is met, gesture trails of Off-screen gestures acquired within a set time length are taken as samples, and the gesture trails included in the samples are divided into at least two gesture sub-trails by set characteristic points.

The updating condition is a preliminary factor triggering a mobile terminal to execute a confusable gesture group updating operation. It can be understood that there are many forms of the updating condition, which will not be limited in the embodiment of the disclosure. For example, it may be a time and may also be a number of Off-screen gesture misrecognition times. Exemplarily, when a user uses an Off-screen gesture function for the first time, an updating time may be set as the updating condition, and a time for which the Off-screen gesture function is used reaches the updating time, an updating indication is generated and an updating operation over the confusable gesture group is triggered by the updating indication to be executed. In at least one embodiment, the updating time may also be a system default time. For another example, the updating condition may be the number of misrecognition times. When running time of an application program started by adopting the Off-screen gesture function is less than a set time threshold value, it is considered that misrecognition occurs once. The number of misrecognition times is recorded through a counter, and when the number of times exceeds a set threshold value for the number of times, the updating indication is generated, the updating operation over the confusable gesture group is triggered by the updating indication to be executed and the counter is reset, where the set threshold value for the number of times may be a system default number of times and may also be a number of times set by the user.

Figure 3B:
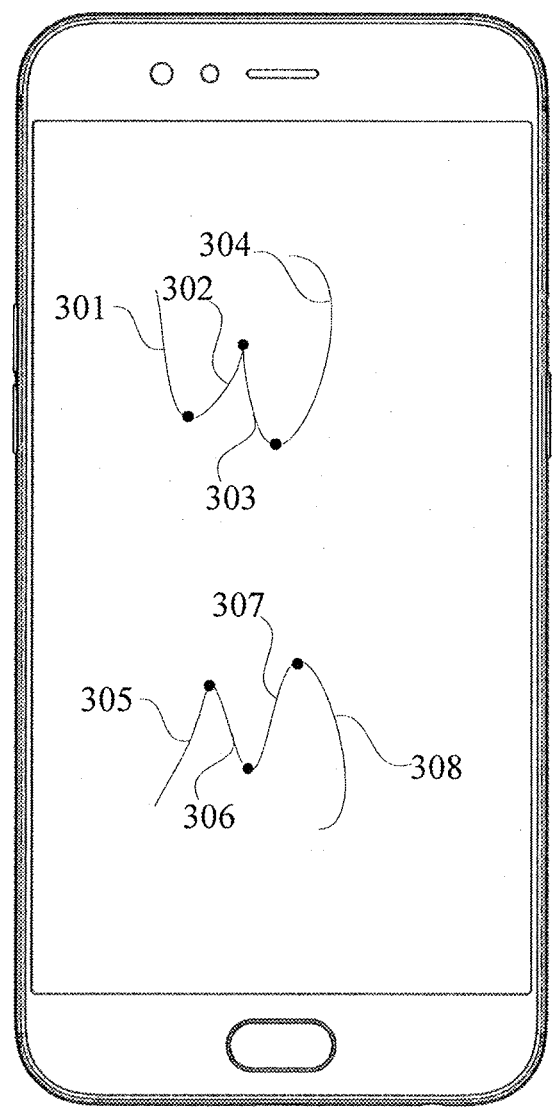
FIG. 3b illustrates a schematic diagram of gesture sub-trails of an Off-screen gesture trail according to an embodiment of the disclosure.

Upon detection of the updating indication, an ending moment of a previous updating operation over the confusable gesture group is taken as a starting time, and gesture trails of Off-screen gestures within a time interval between the starting time and a present time upon detection of the updating indication are acquired. The gesture trails of the Off-screen gestures within the time interval are taken as training samples, and a confusable gesture group is determined in a trail comparison manner. Exemplarily, a plurality of characteristic points are preset, and the gesture trail of each Off-screen gesture is divided into at least two gesture sub-trails according to the characteristic points. FIG. 3b is a schematic diagram of gesture sub-trails of an Off-screen gesture trail according to an embodiment of the disclosure. It should be noted that the Off-screen gesture trail in FIG. 3b is a trail obtained by recognizing an Off-screen gesture input by the user in an Off-screen state by a driver layer, and at this point, the Off-screen gesture trail is not displayed in a display screen. As shown in FIG. 3b, for a gesture trail "W", the gesture trail is divided into a first gesture sub-trail 301, a second gesture sub-trail 302, a third gesture sub-trail 303 and a fourth gesture sub-trail 304 by adopting three characteristic points at turning points. For a gesture trail "M", the gesture trail is divided into a fifth gesture sub-trail 305, a sixth gesture sub-trail 306, a seventh gesture sub-trail 307 and an eighth gesture sub-trail 308 also by adopting three characteristic points at turning points.

It can be understood that there may be many setting manners for the characteristic points, which will not be specifically limited in the embodiment. For example, points may be extracted as the characteristic points at an interval of a set number of coordinate points or pixels on the gesture trail.

In S320, the gesture sub-trails of the Off-screen gestures are compared to determine deviations of the gesture sub-trails.

The deviations may be coordinate differences of sampling points between the gesture sub-trails and may also be numbers of pixels between the gesture sub-trails. An Off-screen gesture is randomly acquired as a reference Off-screen gesture, and a gesture sub-trail of the reference Off-screen gesture is sequentially acquired to be compared with the gesture sub-trails of the other Off-screen gestures. For example, starting points of the gesture sub-trails to be compared are overlapped in a translation manner to determine the deviations between the gesture sub-trails. The other gesture sub-trails of the reference Off-screen gesture are compared with the gesture sub-trails of the other Off-screen gestures in the same manner.

Exemplarily, in the schematic diagram of the gesture sub-trails in FIG. 3b, the gesture trail "W" is taken as the reference Off-screen gesture, and the first gesture sub-trail 301 is acquired to be compared each gesture sub-trail of the gesture trail "M", and it is determined by comparison that a deviation between the first gesture sub-trail 301 and the sixth gesture sub-trail 306 is smaller than a set deviation threshold value. The second gesture sub-trail 302 is acquired to be compared with each gesture sub-trail of the gesture trail "M", and it is determined by comparison that a deviation between the second gesture sub-trail 302 and the seventh gesture sub-trail 307 is smaller than the set deviation threshold value. The other gesture sub-trails of the gesture trail "W" are compared with each gesture sub-trail of the gesture trail "M" in the same manner respectively.

In S330, the gesture sub-trails which has the deviations smaller than a set deviation threshold value is counted.

The deviations obtained by the abovementioned comparison operation are compared with the set deviation threshold value respectively to determine the number of the gesture sub-trails which have the deviations smaller than a set deviation. It can be understood that the set deviation may be freely set according to a practical requirement.

In S340, the original confusable gesture group is updated with a new confusable gesture group. The new confusable gesture group comprises at least two Off-screen gestures, each of the at least two Off-screen gestures having more than a set threshold number of the gesture sub-trails with deviations smaller than the set deviation threshold value.

The number represents a number of the gesture sub-trails, of which the deviations are smaller than the set deviation threshold value, of the Off-screen gestures. When deviations between most of gesture sub-trails included in the at least two Off-screen gestures are smaller, it is determined that these Off-screen gestures are confusable. The confusable Off-screen gestures form the confusable gesture group. Whether the original confusable gesture group includes the new confusable gesture group is determined. When it is determined that the original confusable gesture group includes the new confusable gesture group, the original confusable gesture group will not be updated with the new confusable gesture group. Otherwise, whether the original confusable gesture group includes multiple Off-screen gestures belonging to the new confusable gesture group is determined. When it is determined that the original confusable gesture group includes multiple Off-screen gestures belonging to the new confusable gesture group, the original confusable gesture group is updated with the new confusable gesture group. Otherwise the new confusable gesture group is added into the original confusable gesture group.

According to the technical solution of the embodiment, the gesture trails of the Off-screen gestures acquired within the set time length are taken as the samples, and the gesture trails included in the samples are divided into at least two gesture sub-trails by the set characteristic points. The deviations of the gesture sub-trails of the Off-screen gestures are determined. The gesture sub-trails having the deviations smaller than the set deviation threshold value, are counted. The at least two Off-screen gestures form the new confusable gesture group, each of the at least two Off-screen gestures having more than the set threshold number of the gesture sub-trails with deviations smaller than the set deviation threshold value. The original confusable gesture group is updated with the new confusable gesture group. According to the technical solution of the embodiment of the disclosure, the confusable gesture group is trained by taking gesture trails of historical Off-screen gestures of the user, so that the updated confusable gesture group is more consistent with a writing habit of the user, occurrence of the condition of low Off-screen gesture recognition rate due to different writing habits of different users is avoided, personalized regulation of the confusable gesture group according to the writing habit of the user and regulation of an Off-screen gesture recognition condition on the basis of the regulated confusable gesture group are implemented, and the Off-screen gesture recognition rate is increased.

Figure 4A:
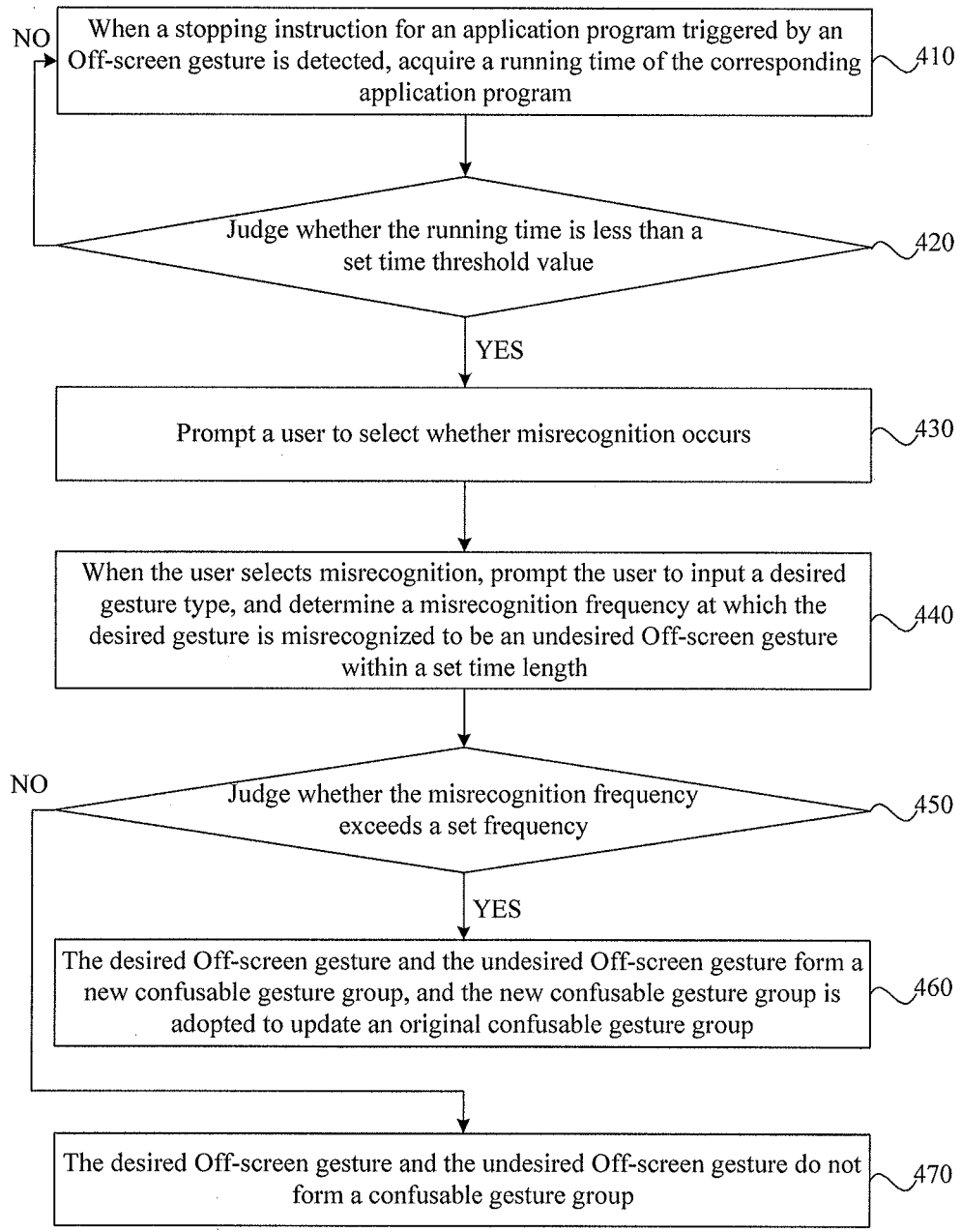
FIG. 4a illustrates a flowchart of another method for updating a confusable gesture group according to an embodiment of the disclosure.

FIG. 4a is a flowchart of another method for updating a confusable gesture group according to an embodiment of the disclosure. As shown in FIG. 4a, the method includes the following actions.

In S410, upon detection of a closing instruction for an application program triggered by an Off-screen gesture, running time of the application program is acquired.

Under a normal condition, when a mobile terminal misrecognizes an Off-screen gesture, an application program corresponding to an undesired Off-screen gesture which is misrecognized may be started. After a user finds that the undesired application program is started, the application program may usually be stopped immediately. At this point, the mobile terminal has been in a screen-on state, and the user may manually find the application program. On the basis of a using habit of the user, delaying for a set time (the set time may be a system default time) may be implemented when the closing instruction for the application program started by the Off-screen gesture. Within the delayed set time, the running time of the application program is acquired. There are many acquisition manners for the running time of the application program, which will not be specifically limited in the embodiment of the disclosure. For example, a starting time may be recorded when the application program is started. A stopping time is recorded when the closing instruction for the application program is received. The running time of the application program is determined according to the starting time and the stopping time.

In at least one embodiment, a function triggered by the Off-screen gesture to be executed may also be monitored, for example, a song switching operation triggered by the Off-screen gesture. A time interval from a present song switching operation to a next song switching operation is recorded for comparison between the time interval and a set time threshold value.

In S420, whether the running time is less than a set time threshold value is judged. When the running time is judged to be less than the set time threshold value, Action 430 is executed, otherwise Action 410 is re-executed.

In S430, a user is prompted to select whether misrecognition occurs.

Figure 4B:
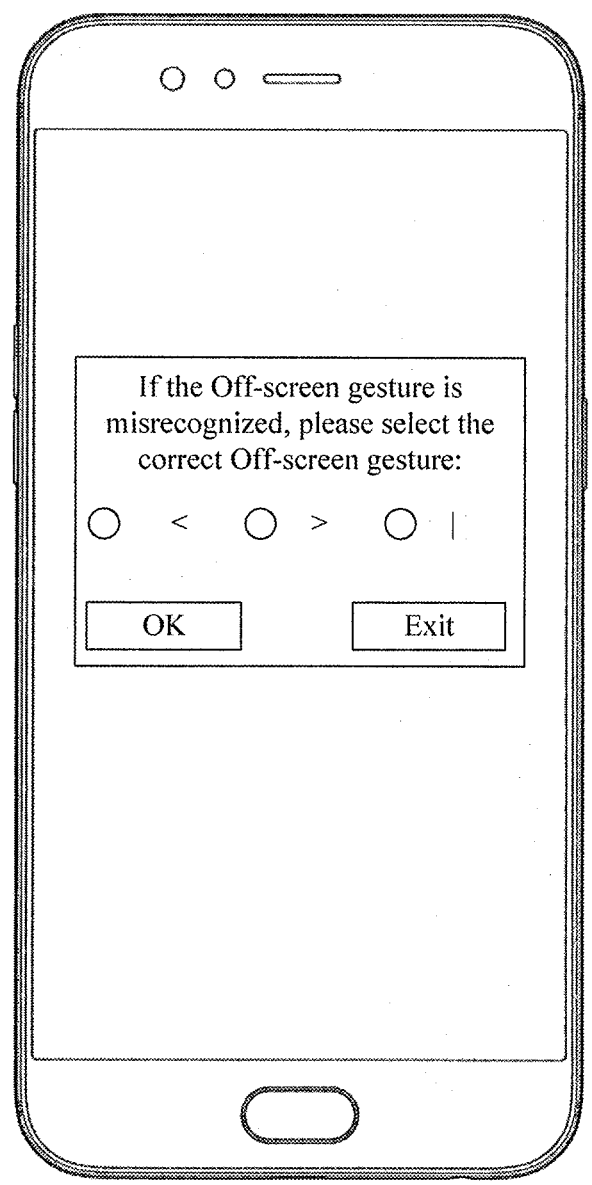
FIG. 4b illustrates a schematic diagram of a dialog box provided for a user to select whether an Off-screen gesture is misrecognized according to an embodiment of the disclosure.

The user may be prompted to select whether the condition that the Off-screen gesture is misrecognized occurs in a manner of displaying a dialog box. FIG. 4b is a schematic diagram of a dialog box provided for a user to select whether an Off-screen gesture is misrecognized according to an embodiment of the disclosure. When the running time of the application program started for the Off-screen gesture is less than the set time threshold value, the dialog box is displayed to prompt the user to select a desired Off-screen gesture. For example, an Off-screen gesture "<" is input by the user, but is actually recognized into an Off-screen gesture "|". An application layer starts an application program corresponding to the Off-screen gesture "|". When the user finds that the started application program is not an application program executed to be started, it is stopped, and at this point, the dialog box shown in FIG. 4b is displayed. When the mobile terminal misrecognizes the Off-screen gesture into "|", an Off-screen gesture with a similar characteristic with the Off-screen gesture "|" in a driver layer is displayed in the dialog box.

When the user clicks to close the dialog box, the user is determined to consider that no misrecognition occurs.

In S440, when the user selects misrecognition, the user is prompted to input a desired gesture, and a misrecognition frequency at which the desired gesture is misrecognized to be an undesired Off-screen gesture within a set time length is determined.

The user selects the desired Off-screen gesture "<" according to a prompt of the dialog box shown in FIG. 4b and clicks OK to implement reporting of a misrecognition operation of the Off-screen gesture. Moreover, reporting information includes the gesture types of the desired Off-screen gesture and the undesired Off-screen gesture. The mobile terminal may determine the misrecognition frequency at which the desired Off-screen gesture is misrecognized to be the undesired Off-screen gesture within the set time length according to the reporting information. The set time length may be a system default time. During a practical application, the Off-screen gesture "<" and an Off-screen gesture ">" are both likely to be misrecognized into "|", and when a misrecognition frequency between the Off-screen gesture "<" and the Off-screen gesture "|" within the set time length is determined, a number of misrecognition times between the Off-screen gesture ">" and the Off-screen gesture "|" may be considered to be accumulated.

In S450, whether the misrecognition frequency exceeds a set frequency is judged. When the misrecognition frequency is judged to exceed the set frequency, S460 is executed, otherwise 470 is executed.

In S460, the desired Off-screen gesture and the undesired Off-screen gesture form a new confusable gesture group, and the new confusable gesture group is adopted to update an original confusable gesture group.

At least two Off-screen gestures between which a misrecognition frequency exceeds the set frequency form the new confusable gesture group. The new confusable gesture group is compared with the original confusable gesture group to determine whether an updating manner for the confusable gesture group is insertion, partial replacement or the like. A specific updating manner is similar to the above-mentioned manner of updating the original confusable gesture group with the new gesture group and will not be elaborated herein.

In S470, the desired Off-screen gesture and the undesired Off-screen gesture do not form a confusable gesture group.

When the recognition frequency is lower than the set frequency, it is determined that both of the desired Off-screen gesture and the undesired Off-screen gesture do not form the confusable gesture group.

According to technical solution of the embodiment, the closing instruction of the user for the application program triggered by the Off-screen gesture is detected. Upon detection of the closing instruction, the running time of the application program is acquired. When the running time is less than the set time threshold value, the user is prompted to select whether misrecognition occurs. The misrecognition frequency between the Off-screen gestures is determined according to selection information input by the user. The at least two Off-screen gestures between which the misrecognition frequency exceeds the set frequency form the new confusable gesture group. The original confusable gesture group is updated with the new confusable gesture group. According to the technical solution of the embodiment of the disclosure, occurrence of the condition of higher Off-screen gesture recognition frequency of the mobile terminal due to different writing norms of different users is avoided, personalized regulation of the confusable gesture group according to a writing habit of the user and regulation of an Off-screen gesture recognition condition on the basis of the regulated confusable gesture group are implemented, and an Off-screen gesture recognition rate is increased.

Figure 5A:
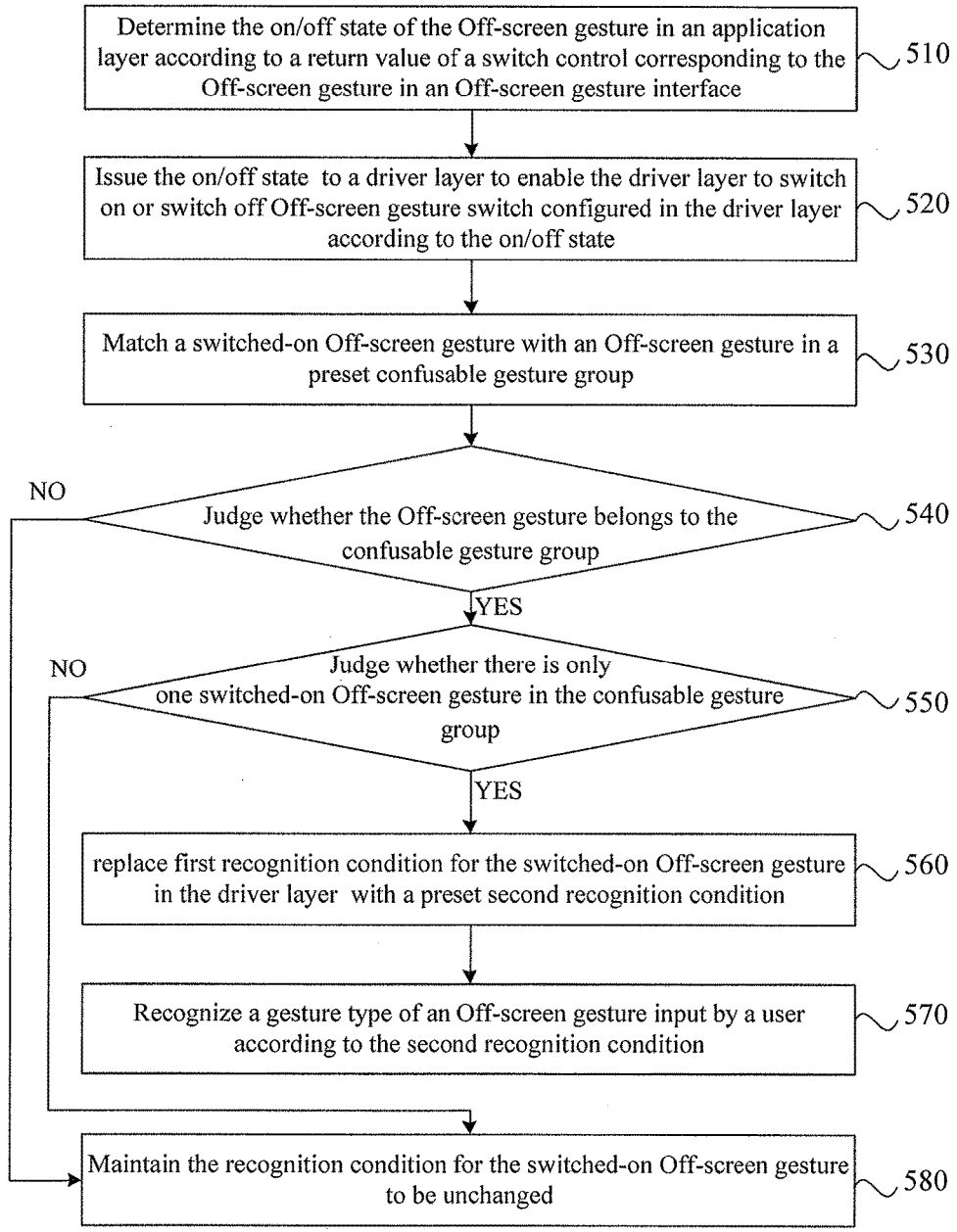
FIG. 5a illustrates a flowchart of another method for recognizing an Off-screen gesture according to an embodiment of the disclosure.

FIG. 5a is a flowchart of another method for recognizing an Off-screen gesture according to an embodiment of the disclosure. As shown in FIG. 5a, the method includes the following actions.

In S510, the on/off state of the Off-screen gesture in an application layer is determined according to a return value of a switch control corresponding to the Off-screen gesture in an Off-screen gesture interface.

Exemplarily, when a user changes an on/off state of a certain Off-screen gesture switch in the Off-screen gesture interface, the application layer correspondingly modifies the return value of the switch control corresponding to the Off-screen gesture switch according to the operation of the user. When monitoring that the return value of the switch control corresponding to a certain Off-screen gesture is a value representing an on state, a mobile terminal determines that the Off-screen gesture switch is in the on state.

In S520, the on/off state is issued to a driver layer to enable the driver layer to switch on or switch off Off-screen gesture switch configured in the driver layer according to the on/off state.

The mobile terminal sends an on/off state synchronization message containing an Off-screen gesture identifier to the driver layer. When receiving the on/off state synchronization message, the driver layer finds the corresponding Off-screen gesture according to the Off-screen gesture identifier. The on/off state of the Off-screen gesture in the driver layer is regulated according to switch information contained in the on/off state synchronization message. The driver layer preliminarily screens the Off-screen gesture to implement no reporting of an Off-screen gesture event for an Off-screen gesture which is not switched on and avoid processing resource waste caused by execution of reading gesture data of the Off-screen gesture which is not switched on by the application layer.

In S530, a switched-on Off-screen gesture is matched with an Off-screen gesture in a preset confusable gesture group.

The preset confusable gesture group is queried according to the switched-on Off-screen gesture to judge whether the Off-screen gesture belongs to a certain confusable gesture group.

In S540, whether the Off-screen gesture belongs to the confusable gesture group is judged. When the Off-screen gesture is judged to belong to the confusable gesture group, S550 is executed, otherwise S580 is executed.

In S550, whether there is only one switched-on Off-screen gesture in the confusable gesture group is judged. When it is judged that there is only one switched-on Off-screen gesture in the confusable gesture group, S560 is executed, otherwise S580 is executed.

In S560, a first recognition condition for the switched-on Off-screen gesture in the driver layer is replaced with a preset second recognition condition.

Exemplarily, when there is only one Off-screen gesture in an on state in the confusable gesture group to which the Off-screen gesture belongs, a condition that a number of pixels between a starting point and a terminal point of an Off-screen gesture does not exceed a first number in the first recognition condition for the switched-on Off-screen gesture is updated into a condition that it does not exceed a second number to obtain the second recognition condition, where the second number is larger than the first number.

In S570, a gesture type of an Off-screen gesture input by a user is recognized according to the second recognition condition.

Figure 5B:
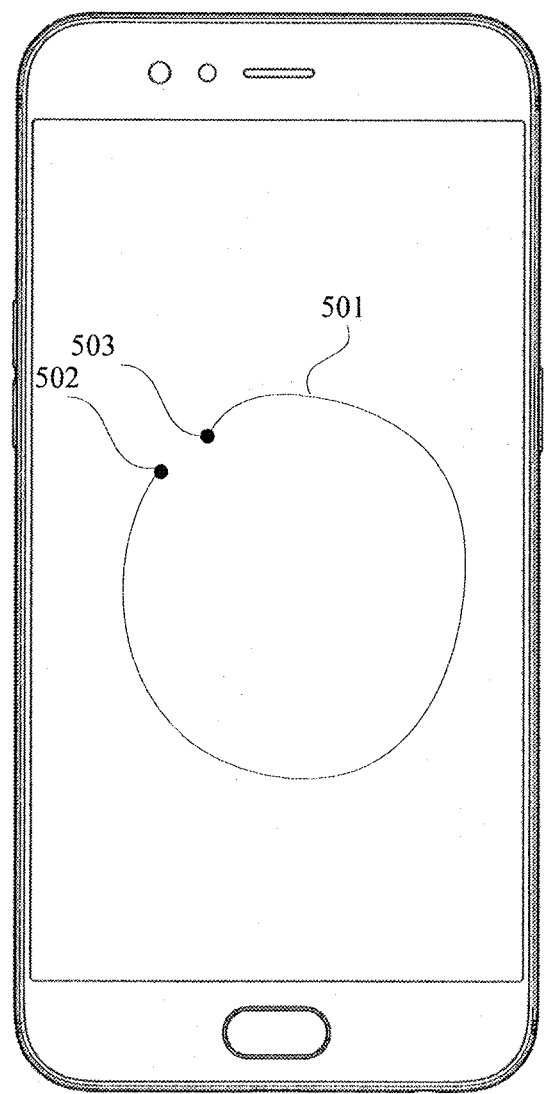
FIG. 5b illustrates a schematic diagram of a gesture trail of an Off-screen gesture according to an embodiment of the disclosure.

The driver layer may calculate a gesture trail of the Off-screen gesture in a curve fitting manner according to gesture coordinates corresponding to the Off-screen gesture input by the user, determine a starting point and a terminal point of the gesture tail, count pixels between the starting point and the terminal point, match the number of the pixels with the preset second recognition condition and determine a gesture type corresponding to the gesture trail according to a result of the matching. FIG. 5b is a schematic diagram of a gesture trail of an Off-screen gesture according to an embodiment of the disclosure. It should be noted that the Off-screen gesture trail in FIG. 5b is a trail obtained by recognizing the Off-screen gesture input by the user in an Off-screen state by the driver layer, and at this point, the Off-screen gesture trail is not displayed in a display screen. As shown in FIG. 5b, it has been calculated in the curve fitting manner that the Off-screen gesture trail 501 is closer to a gesture type "O", and then it is preliminarily determined that the Off-screen gesture is "O". The first recognition condition for the Off-screen gesture is that there are not more than 10 pixels between the starting point and terminal point of the gesture trail. However, since an Off-screen gesture "V" forming a confusable gesture pair with the Off-screen gesture "O" is not switched on, the second recognition condition is adopted for gesture recognition, where the second recognition condition is that the number of the pixels between the starting point and terminal point of the gesture trail does not exceed 15. At this point, a number of pixels between a starting point 502 and terminal point 503 in the gesture trail 501 of the Off-screen gesture "O" shown in FIG. 5b is acquired. The number of the pixels is compared with the second pixel number (i.e., a pixel number of 15) specified by the second recognition condition. When it is smaller than the second pixel number, it is determined that the Off-screen gesture is "O", and an Off-screen gesture event is reported to the application layer. When it is larger than the second pixel number, it is determined that the Off-screen gesture is "V", and since the Off-screen gesture "V" is not switched on, no Off-screen gesture event is reported to the application layer. Therefore, even though Off-screen gestures input by the user are non-standard, Off-screen gestures practically switched on by the user are more likely to be recognized by adopting the technical solution.

In S580, the recognition condition for the switched-on Off-screen gesture is maintained to be unchanged.

When the Off-screen gesture input by the user at present does not belong to any confusable gesture group, or, when the Off-screen gesture input by the user at present belongs to a certain confusable gesture group but other Off-screen gestures in the confusable gesture group are also switched on, the recognition condition for the switched-on Off-screen gesture is maintained to be unchanged.

According to the technical solution of the embodiment, the switched-on Off-screen gesture is matched with the confusable gesture group. When there is only one Off-screen gesture in the on state in the confusable gesture group to which the Off-screen gesture belongs, a condition that the number of the pixels between the starting point and terminal point of the Off-screen gesture does not exceed the first number in the recognition condition for the switched-on Off-screen gesture is modified into a condition that it is does not exceed the second number to obtain the second recognition condition, where the second number is larger than the first number. Therefore, the recognition condition for the switched-on Off-screen gesture may be pertinently regulated according to an Off-screen gesture configuration made by the user, misrecognition of part of confusable gestures may be effectively avoided, and an Off-screen gesture recognition rate is increased.

Figure 6:
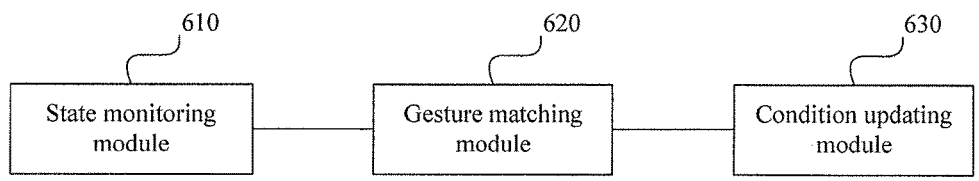
FIG. 6 illustrates a structure block diagram of a device for recognizing an Off-screen gesture according to an embodiment of the disclosure.

FIG. 6 is a structure block diagram of a device for recognizing an Off-screen gesture according to an embodiment of the disclosure. The device may be implemented by software and/or hardware and is usually integrated in a mobile terminal. As shown in FIG. 6, the device may include a state monitoring module 610, a gesture matching module 620 and a condition updating module 630.

The state monitoring module 610 is configured to monitor an on/off state of each of Off-screen gestures in an application layer and update an Off-screen gesture switch in a driver layer according to the on/off state.

The gesture matching module 620 is configured to match a switched-on Off-screen gesture with an Off-screen gesture in a preset confusable gesture group and determine whether to change a recognition condition for the switched-on Off-screen gesture according to a result of the matching.

The condition updating module 630 is configured to, when determining to change the recognition condition for the switched-on Off-screen gesture, replace, with a preset second recognition condition, a first recognition condition for the switched-on Off-screen gesture in the driver layer and recognize a gesture type of an Off-screen gesture input by a user according to the second recognition condition.

The technical solution of the embodiment of the disclosure provides the device for recognizing an Off-screen gesture, no response is given to an Off-screen gesture which is not switched on according to an Off-screen gesture configuration made by a user, and the recognition condition for the switched-on Off-screen gesture is pertinently regulated according to the Off-screen gesture configuration made by the user, so that occurrence of the condition of low Off-screen gesture recognition rate existing at present is effectively avoided, and the gesture recognition rate is increased.

In at least one embodiment, the state monitoring module 610 is specifically configured to:
  determine the on/off state of the Off-screen gesture in the application layer according to a return value of a switch control corresponding to the Off-screen gesture in an Off-screen gesture interface; and
  issue the on/off state to the driver layer to enable the driver layer to switch on or switch off the Off-screen gesture switch configured in the driver layer according to the on/off state.

In at least one embodiment, the device further includes a gesture group updating module.

The gesture group updating module is configured to, when an updating condition for the confusable gesture group is met, take gesture trails of Off-screen gestures acquired within a set time length as samples and divide the gesture trails included in the samples into at least two gesture sub-trails by set characteristic points;
  compare the gesture sub-trails of the Off-screen gestures to determine deviations of the gesture sub-trails;
  count the gesture sub-trails which have the deviations smaller than a set deviation threshold value; and
  update the original confusable gesture group with a new confusable gesture group, wherein the new confusable gesture group comprises at least two Off-screen gestures, each of the at least two Off-screen gestures having more than a set threshold number of the gesture sub-trails with the deviations smaller than the set deviation threshold value.

In at least one embodiment, the device further includes a gesture group updating module.

The gesture group updating module is configured to, upon detection of a closing instruction for an application program triggered by the Off-screen gesture, acquire running time of the application program;
  when the running time is less than a set time threshold value, prompt the user to select whether misrecognition occurs;
  determine a misrecognition frequency at which one of the Off-screen gestures is misrecognized to be another one of the Off-screen gestures according to selection information input by the user; and
  update the original confusable gesture group with a new confusable gesture group, wherein the new confusable gesture group comprises at least two Off-screen gestures between which the misrecognition frequency exceeds a set frequency.

In at least one embodiment, the gesture matching module 620 includes: a first matching sub-module and a second matching sub-module.

The first matching sub-module is configured to, when the result of the matching indicates that the Off-screen gesture does not belong to any confusable gesture group, or, when the result of the matching indicates that at least two Off-screen gestures in the confusable gesture group to which the Off-screen gesture belongs is in an on state, maintain the recognition condition for the switched-on Off-screen gesture to be unchanged.

The second matching sub-module is configured to, when the result of the matching indicates that there is only one Off-screen gesture in the on state in the confusable gesture group to which the Off-screen gesture belongs, change the recognition condition for the switched-on Off-screen gesture.

In at least one embodiment, the second matching sub-module is specifically configured to:
  update a condition that a number of pixels between a starting point and a terminal point of the Off-screen gesture does not exceed a first number in the first recognition condition for the switched-on Off-screen gesture into a condition that it is does not exceed a second number to obtain the second recognition condition, where the second number is larger than the first number.

In at least one embodiment, the condition updating module 630 is specifically configured to:
  calculate a gesture trail of the Off-screen gesture in a curve fitting manner according to gesture coordinates corresponding to the Off-screen gesture input by the user;
  determine a starting point and a terminal point of the Off-screen gesture and count a number of pixels between the starting point and the terminal point; and match the number of the pixels with the preset second recognition condition and determine the gesture type corresponding to the Off-screen gesture according to a result of the matching.

The embodiments of the disclosure further provide a storage medium including a computer-executable instruction, the computer-executable instruction being executed by a computer processor to execute a method for recognizing an Off-screen gesture, which including the following actions.

An on/off state of each of Off-screen gestures in an application layer is monitored, and an Off-screen gesture switch in a driver layer is updated according to the on/off state.

A switched-on Off-screen gesture is matched with an Off-screen gesture in a preset confusable gesture group, and whether to change a recognition condition for the switched-on Off-screen gesture is determined according to a result of the matching.

When determining to change the recognition condition for the switched-on Off-screen gesture, a first recognition condition for the switched-on Off-screen gesture in the driver layer is replaced with a preset second recognition condition, and a gesture type of an Off-screen gesture input by a user is recognized according to the second recognition condition.

The storage medium is any one in various types of memory equipment or storage equipment. Term "storage medium" is intended to include: an installation medium, for example, a Compact Disc Read-Only Memory (CD-ROM), a floppy disk or a magnetic tape device; a computer system memory or a Random Access Memory (RAM), for example, a Dynamic RAM (DRAM), a Double Data Rate RAM (DDR RAM), a Static RAM (SRAM), an Extended Data Output RAM (EDO RAM) and a Rambus RAM; a nonvolatile memory, for example, a flash memory and a magnetic medium (for example, a hard disk or an optical memory); and a register, a memory component of another similar type or the like. The storage medium may further include memories of other types or combinations thereof. In addition, the storage medium may be located in a first computer system in which a program is executed, or may be located in a second different computer system, the second computer system being connected to the first computer system through a network (for example, the Internet). The second computer system may provide a program instruction for a first computer to execute. Term "storage medium" may include two or more storage media capable of residing at different locations (for example, in different computer systems connected through the network). The storage medium may store program instructions (for example, specifically implemented into computer programs) by one or more processors.

Of course, the computer-executable instruction of the storage medium, provided by the embodiments of the disclosure, including the computer-executable instruction is not limited to the abovementioned Off-screen gesture recognition operation, and may further execute a related operation in a method for recognizing an Off-screen gesture provided by any embodiment of the disclosure.

Figure 7:
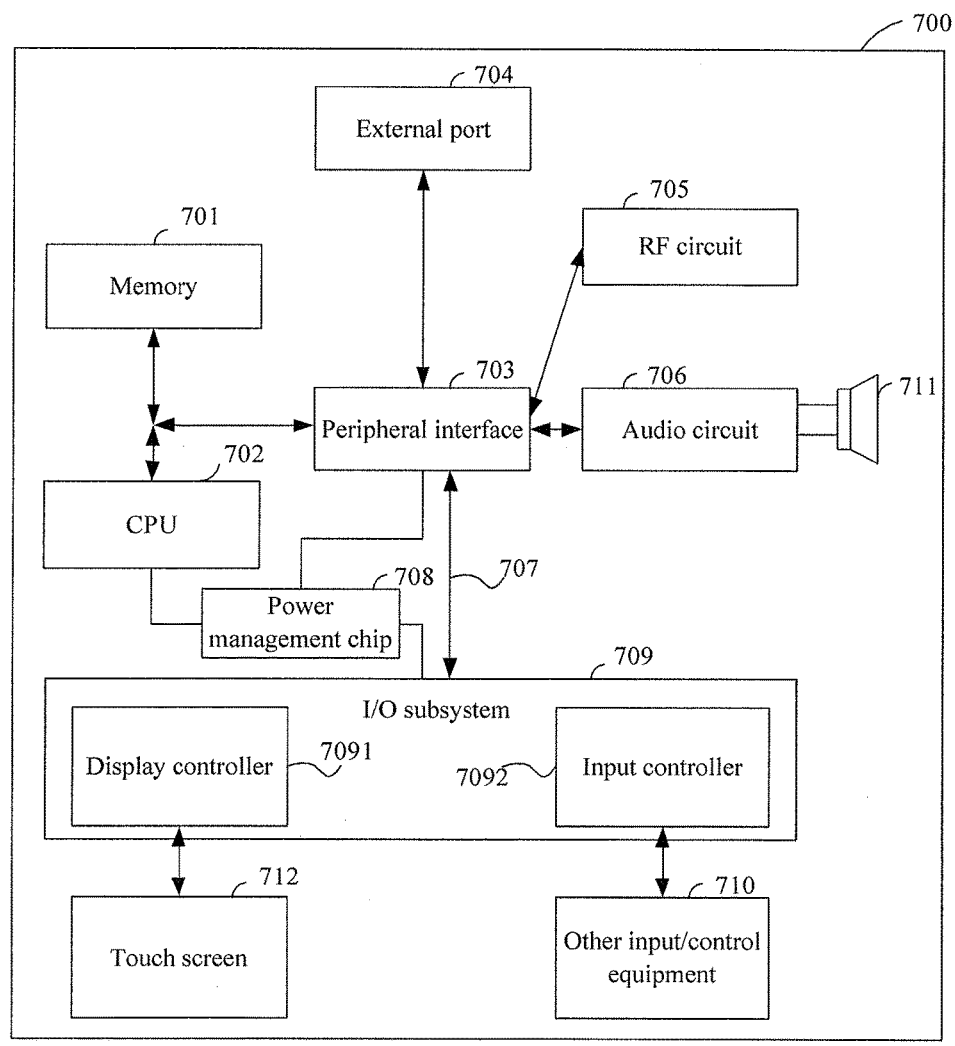
FIG. 7 illustrates a structure diagram of a mobile terminal according to an embodiment of the disclosure.

The embodiments of the disclosure provide a mobile terminal, and in the mobile terminal, an Off-screen gesture recognition method device provided by the embodiments of the disclosure may be integrated. FIG. 7 is a structure diagram of a mobile terminal according to an embodiment of the disclosure. As shown in FIG. 7, the mobile terminal may include: a casing (not shown in the figure), a memory 701, a Central Processing Unit (CPU) 702 (also called as a processor), a circuit board (not shown in the figure), a touch screen 712 and a power circuit (not shown in the figure). The touch screen 712 is configured to convert an operation of a user into an electric signal for input into the processor and display a visual output signal; the circuit board is arranged in a space enclosed by the touch screen 712 and the casing; the CPU 702 and the memory 701 are arranged on the circuit board; the power circuit is configured to supply power to each circuit or device of the mobile terminal; the memory 701 is configured to store a computer program; and the CPU 702 reads and executes the computer program stored in the memory 701. The CPU 702 executes the computer program to implement the following actions. An on/off state of each of Off-screen gestures in an application layer is monitored. An Off-screen gesture switch in a driver layer is updated according to the on/off state. A switched-on Off-screen gesture is matched with an Off-screen gesture in a preset confusable gesture group, and whether to change a recognition condition for the switched-on Off-screen gesture is determined according to a result of the matching. When determining to change the recognition condition for the switched-on Off-screen gesture, a first recognition condition for the switched-on Off-screen gesture in the driver layer is replaced with a preset second recognition condition, and a gesture type of an Off-screen gesture input by a user is recognized according to the second recognition condition.

The mobile terminal further includes: a peripheral interface 703, a Radio Frequency (RF) circuit 705, an audio circuit 706, a speaker 711, a power management chip 708, an Input/Output (I/O) subsystem 709, other input/control equipment 710 and an external port 704, and these parts communicate through one or more communication buses or signal wires 707.

It should be understood that the mobile terminal 700 shown in the figure is only an example of the mobile terminal, the mobile terminal 700 may have more or fewer components than those shown in the figure, two or more components may be combined and different component configurations may be made. Each component shown in the figure may be implemented in hardware including one or more signal processing and/or application specific integrated circuits, software or a combination of the hardware and the software.

The mobile terminal provided by the embodiments and integrated with the device for recognizing an Off-screen gesture will be described below in detail. For example, the mobile terminal is a mobile phone.

The memory 701: the memory 701 may be accessed by the CPU 702, the peripheral interface 703 and the like, and the memory 701 may include a high-speed RAM and may further include a nonvolatile memory, for example, one or more disk storage devices, flash memories or other nonvolatile solid-stage storage devices.

The peripheral interface 703: the peripheral interface 703 may connect the I/O peripherals of equipment to the CPU 702 and the memory 701.

The I/O subsystem 709: the I/O subsystem 709 may connect the I/O peripherals of the equipment, for example, the touch screen 712 and the other input/control equipment 710 to the peripheral interface 703. The I/O subsystem 709 may include a display controller 7091 and one or more input controllers 7092 configured to control the other input/control equipment 710, where the one or more input controllers 7092 receive electric signals from the other input/control equipment 710 or send electric signals to the other input/control equipment 710, and the other input/control equipment 710 may include a physical button (a pressing button and a rocker arm button), a dial, a slide switch, a joystick and a click roller. It is important to note that the input controller 7092 may be connected with any one of a keyboard, an infrared port, a Universal Serial Bus (USB) interface and indication equipment such as a mouse.

The touch screen 712: the touch screen 712 is an input interface and output interface between the user terminal and the user and displays visual output to the user, and the visual output may include a graph, a text, an icon, a video and the like.

The display controller 7091 in the I/O subsystem 709 receives an electric signal from the touch screen 712 or sends an electric signal to the touch screen 712. The touch screen 712 detects a contact on the touch screen, the display controller 7091 converts the detected contact into interaction with a user interface object displayed on the touch screen 712 to implement human-computer interaction, and the user interface object displayed on the touch screen 712 may be an icon of a running game, an icon of connection to a corresponding network and the like. It is important to note that the equipment may further include an optical mouse, and the optical mouse is a touch-sensitive surface which does not display visual output or an extension of a touch-sensitive surface formed by the touch screen.

The RF circuit 705 is mainly configured to establish communication between the mobile phone and a wireless network (i.e., a network side) to implement data receiving and sending between the mobile phone and the wireless network, for example, receiving and sending of a short message and an electronic mail. Specifically, the RF circuit 705 receives and sends an RF signal, the RF signal being called as an electromagnetic signal also, and the RF circuit 705 converts an electric signal into an electromagnetic signal or converts an electromagnetic signal into an electric signal and communicates with the communication network and other equipment through the electromagnetic signal. The RF circuit 705 may include a known circuit configured to execute these functions, including, but not limited to, an antenna system, an RF transceiver, one or more amplifiers, a tuner, one or more oscillators, a digital signal processor, a COder-DECoder (CODEC) chip set, a Subscriber Identity Module (SIM) and the like.

The audio circuit 706 is mainly configured to receive audio data from the peripheral interface 703, convert the audio data into an electric signal and send the electric signal to the speaker 711.

The speaker 711 is configured to restore a voice signal received from the wireless network by the mobile phone through the RF circuit 705 into a sound and play the sound to the user.

The power management chip 708 is configured to perform power supply and power management on the CPU 702, the I/O subsystem and hardware connected with the peripheral interface.

The mobile terminal provided by the embodiments of the disclosure may effectively avoid occurrence of the condition of low Off-screen gesture recognition rate existing at present and increases the gesture recognition rate.

Figure 8:
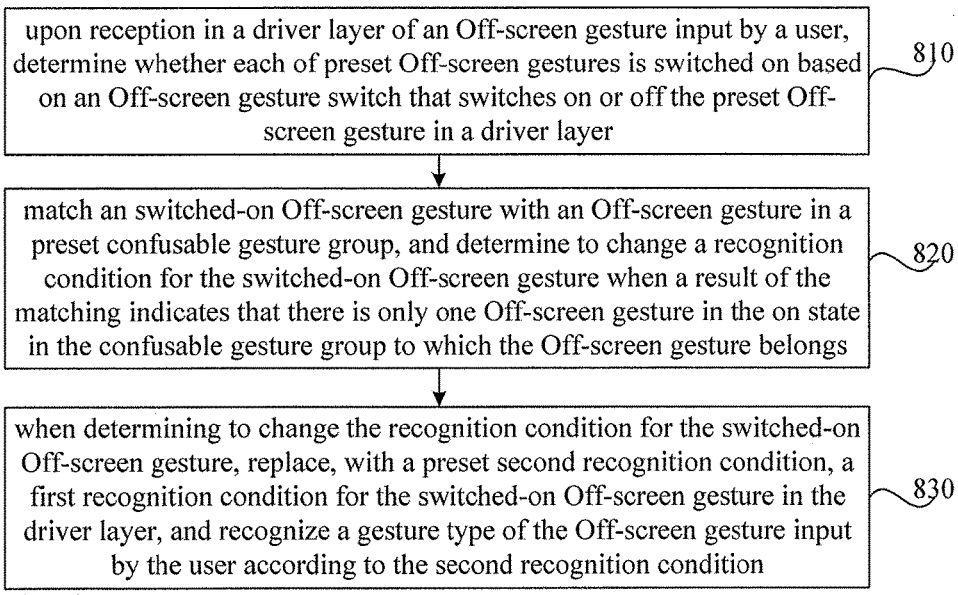
FIG. 8 illustrates a flowchart of another method for recognizing an Off-screen gesture according to an embodiment of the disclosure.

FIG. 8 is a flowchart of another method for recognizing an Off-screen gesture according to an embodiment of the disclosure. The method may be executed by a device for recognizing an Off-screen gesture. The device may be implemented by software and/or hardware, and may usually be integrated in a mobile terminal. As shown in FIG. 8, the method includes the following actions:

In S810, upon reception in a driver layer of an Off-screen gesture input by a user, whether each of preset Off-screen gestures is switched on is determined based on an Off-screen gesture switch that switches on or off the preset Off-screen gesture in a driver layer.

In S820, a switched-on Off-screen gesture is matched with an Off-screen gesture in a preset confusable gesture group. A recognition condition for the switched-on Off-screen gesture is determined to be changed when a result of the matching indicates that there is only one Off-screen gesture in the on state in the confusable gesture group to which the Off-screen gesture belongs.

In S830, when determining to change the recognition condition for the switched-on Off-screen gesture, a first recognition condition for the switched-on Off-screen gesture in the driver layer is replaced with a preset second recognition condition. A gesture type of the Off-screen gesture input by the user is recognized according to the second recognition condition.

In at least one embodiment, upon reception of an Off-screen gesture input by a user in a driver layer, before determining whether each of the Off-screen gestures is switched on based on an Off-screen gesture switch that switches on or off the Off-screen gesture in a driver layer, the method further includes:

monitoring the on/off state of each of the Off-screen gestures in the application layer and updating the Off-screen gesture switch in the driver layer according to the on/off state.

In at least one embodiment, the method further includes:
when an updating condition for the confusable gesture group is met, taking a gesture trail of each of Off-screen gestures acquired within a set time length as an sample, and dividing the gesture trail of the sample of the Off-screen gesture into at least two gesture sub-trails by set characteristic points;
for each of the Off-screen gestures, comparing each of the gesture sub-trails of the Off-screen gesture with the gesture sub-trails of the remaining ones of the Off-screen gestures, to determine deviations of the gesture sub-trails of the Off-screen gesture relative to the gesture sub-trails of the remaining Off-screen gestures;
for each of the Off-screen gestures, counting the gesture sub-trails that have the deviations smaller than a set deviation threshold value; and
updating an original confusable gesture group with a new confusable gesture group that comprises at least two Off-screen gestures, wherein the number of the gesture sub-trails with the deviations smaller than the set deviation threshold value between the at least two Off-screen gestures exceeds a set threshold number.

In at least one embodiment, the updating condition is that a time for which an Off-screen gesture function is used reaches a preset updating time; or the updating condition is that a number of misrecognition times exceeds a set threshold value for the number of misrecognition times.

In at least one embodiment, the deviation is a coordinate difference of sampling points between the gesture sub-trails; or the deviation is a number of pixels between the gesture sub-trails.

In at least one embodiment, the method further includes:
upon detection of a closing instruction for an application program triggered by the Off-screen gesture, acquiring running time of the application program;
when the running time is less than a set time threshold value, prompting the user to select whether misrecognition occurs;
determining a misrecognition frequency at which one of the Off-screen gestures is misrecognized to be another one of the Off-screen gestures according to selection information input by the user; and updating an original confusable gesture group with a new confusable gesture group, wherein the new confusable gesture group comprises at least two Off-screen gestures between which the misrecognition frequency exceeds a set frequency.

In at least one embodiment, judging whether to change the recognition condition for the switched-on Off-screen gesture according to the result of the matching includes:

when the result of the matching indicates that the Off-screen gesture does not belong to any confusable gesture group, or when the result of the matching indicates that at least two Off-screen gestures in the confusable gesture group to which the Off-screen gesture belongs is in an on state, maintaining the recognition condition for the switched-on Off-screen gesture to be unchanged.

In at least one embodiment, the first recognition condition comprises that a number of pixels between a starting point and a terminal point of the Off-screen gesture does not exceed a first number, and the second recognition condition comprises that the number of pixels between the starting point and the terminal point of an Off-screen gesturer does not exceed a second number, wherein the second number is larger than the first number.

In at least one embodiment, recognizing the gesture type of the Off-screen gesture input by the user according to the second recognition condition includes:

calculating a gesture trail of the Off-screen gesture in a curve fitting manner according to gesture coordinates corresponding to the Off-screen gesture input by the user;

determining a starting point and a terminal point of the Off-screen gesture, and counting pixels between the starting point and the terminal point; and matching the number of the pixels with the preset second recognition condition, and determining the gesture type corresponding to the Off-screen gesture according to a result of the matching.

In at least one embodiment, monitoring the on/off state of each of the Off-screen gestures in the application layer and updating the Off-screen gesture switch in the driver layer according to the on/off state includes:

determining the on/off state of the Off-screen gesture in the application layer according to a return value of a switch control corresponding to the Off-screen gesture in an Off-screen gesture interface; and issuing the on/off state to the driver layer which switches on or off the Off-screen gesture switch in the driver layer according to the on/off state.

The device, storage medium and mobile terminal for recognizing an Off-screen gesture provided in the embodiments may execute the method for recognizing an Off-screen gesture provided by any embodiment of the disclosure and have corresponding modules for executing the method and beneficial effects. Technical details which are not elaborated in the embodiments may refer to the method for recognizing an Off-screen gesture provided by any embodiment of the disclosure.

It is important to note that the above is only the preferred embodiment of the disclosure and a technical principle which is applied. Those skilled in the art should know that the disclosure is not limited to the specific embodiments described here, and those skilled in the art may make various apparent variations, regulations and replacements without departing from the scope of protection of the disclosure.

Therefore, although the disclosure has been described above with the embodiments in more detail, the disclosure is not limited to the embodiments and may further include more other equivalent embodiments without departing from the concept of the disclosure, and the scope of the disclosure is determined by the scope of the appended claims.

The invention claimed is:

1. A method for recognizing an Off-screen gesture, the method comprising:

upon reception in a driver layer of an Off-screen gesture input by a user, determining whether each of preset Off-screen gestures is switched on based on an Off-screen gesture switch that switches on or off the preset Off-screen gesture in the driver layer;

matching an switched-on Off-screen gesture with an Off-screen gesture in a preset confusable gesture group, and determining to change a recognition condition for the switched-on Off-screen gesture when a result of the matching indicates that there is only one Off-screen gesture in the on state in the confusable gesture group to which the Off-screen gesture belongs; and when determining to change the recognition condition for the switched-on Off-screen gesture, replacing, with a preset second recognition condition, a first recognition condition for the switched-on Off-screen gesture in the driver layer, and recognizing a gesture type of the Off-screen gesture input by the user according to the second recognition condition.

2. The method according to claim 1, wherein upon reception of an Off-screen gesture input by the user in the driver layer, before determining whether each of the Off-screen gestures is switched on based on the Off-screen gesture switch that switches on or off the Off-screen gesture in the driver layer, the method further comprises:

monitoring an on/off state of each of an Off-screen gestures in an application layer and updating the Off-screen gesture switch in the driver layer according to the on/off state.

3. The method according to claim 1, further comprising:

when an updating condition for the confusable gesture group is met, taking a gesture trail of each of Off-screen gestures acquired within a set time length as a sample, and dividing the gesture trail of the sample of the Off-screen gesture into at least two gesture sub-trails by set characteristic points;

for each of the Off-screen gestures, comparing each of the gesture sub-trails of the Off-screen gesture with the gesture sub-trails of remaining ones of the Off-screen gestures, to determine deviations of the gesture sub-trails of the Off-screen gesture relative to the gesture sub-trails of the remaining Off-screen gestures;

for each of the Off-screen gestures, counting the gesture sub-trails that have the deviations smaller than a set deviation threshold value; and updating an original confusable gesture group with a new confusable gesture group that comprises at least two Off-screen gestures, wherein a number of the gesture sub-trails with the deviations smaller than the set deviation threshold value between the at least two Off-screen gestures exceeds a set threshold number.

4. The method according to claim 3, wherein the updating condition is that a time for which an Off-screen gesture function is used reaches a preset updating time; or the updating condition is that a number of misrecognition times exceeds a set threshold value for the number of misrecognition times.

5. The method according to claim 3, wherein the deviation is a coordinate difference of sampling points between the gesture sub-trails; or the deviation is a number of pixels between the gesture sub-trails.

6. The method according to claim 1, further comprising:
upon detection of a closing instruction for an application program triggered by the Off-screen gesture, acquiring running time of the application program;
when the running time is less than a set time threshold value, prompting the user to select whether misrecognition occurs;
determining a misrecognition frequency at which one of the Off-screen gestures is misrecognized to be another one of the Off-screen gestures according to selection information input by the user; and
updating an original confusable gesture group with a new confusable gesture group, wherein the new confusable gesture group comprises at least two Off-screen gestures between which the misrecognition frequency exceeds a set frequency.

7. The method according to claim 1, wherein judging whether to change the recognition condition for the switched-on Off-screen gesture according to the result of the matching comprises:
when the result of the matching indicates that the Off-screen gesture does not belong to any confusable gesture group, or when the result of the matching indicates that at least two Off-screen gestures in the confusable gesture group to which the Off-screen gesture belongs is in an on state, maintaining the recognition condition for the switched-on Off-screen gesture to be unchanged.

8. The method according to claim 1, wherein the first recognition condition comprises that a number of pixels between a starting point and a terminal point of the Off-screen gesture does not exceed a first number, and the second recognition condition comprises that the number of pixels between the starting point and the terminal point of an Off-screen gesture does not exceed a second number, wherein the second number is larger than the first number.

9. The method according to claim 1, wherein recognizing the gesture type of the Off-screen gesture input by the user according to the second recognition condition comprises:
calculating a gesture trail of the Off-screen gesture in a curve fitting manner according to gesture coordinates corresponding to the Off-screen gesture input by the user;
determining a starting point and a terminal point of the Off-screen gesture, and counting pixels between the starting point and the terminal point; and
matching a number of the pixels with the preset second recognition condition, and determining the gesture type corresponding to the Off-screen gesture according to a result of the matching.

10. The method according to claim 2, wherein monitoring the on/off state of each of the Off-screen gestures in the application layer and updating the Off-screen gesture switch in the driver layer according to the on/off state comprises:
determining the on/off state of the Off-screen gesture in the application layer according to a return value of a switch control corresponding to the Off-screen gesture in an Off-screen gesture interface; and
issuing the on/off state to the driver layer which switches on or off the Off-screen gesture switch in the driver layer according to the on/off state.

11. A non-transitory computer-readable storage medium, on which a computer program is stored, the program being executed by a processor to implement a method for recognizing an Off-screen gesture, wherein the method comprises:
upon reception in a driver layer of an Off-screen gesture input by a user, determining whether each of preset Off-screen gestures is switched on based on an Off-screen gesture switch that switches on or off the preset Off-screen gesture in the driver layer;
matching an switched-on Off-screen gesture with an Off-screen gesture in a preset confusable gesture group, and determining to change a recognition condition for the switched-on Off-screen gesture when a result of the matching indicates that there is only one Off-screen gesture in the on state in the confusable gesture group to which the Off-screen gesture belongs; and
when determining to change the recognition condition for the switched-on Off-screen gesture, replacing, with a preset second recognition condition, a first recognition condition for the switched-on Off-screen gesture in the driver layer, and recognizing a gesture type of the Off-screen gesture input by the user according to the second recognition condition.

12. A mobile terminal, comprising a memory, a processor and a computer program stored on the memory and capable of running on the processor, the processor executing the computer program to implement a method for recognizing an Off-screen gesture, wherein the method comprises:
upon reception in a driver layer of an Off-screen gesture input by a user, determining whether each of preset Off-screen gestures is switched on based on an Off-screen gesture switch that switches on or off the preset Off-screen gesture in the driver layer;
matching an switched-on Off-screen gesture with an Off-screen gesture in a preset confusable gesture group, and determining to change a recognition condition for the switched-on Off-screen gesture when a result of the matching indicates that there is only one Off-screen gesture in the on state in the confusable gesture group to which the Off-screen gesture belongs; and
when determining to change the recognition condition for the switched-on Off-screen gesture, replacing, with a preset second recognition condition, a first recognition condition for the switched-on Off-screen gesture in the driver layer, and recognizing a gesture type of the Off-screen gesture input by the user according to the second recognition condition.

13. The mobile terminal according to claim 12, wherein upon reception of an Off-screen gesture input by the user in the driver layer, before determining whether each of the Off-screen gestures is switched on based on the Off-screen gesture switch that switches on or off the Off-screen gesture in the driver layer, the method further comprises:
monitoring an on/off state of each of the Off-screen gestures in an application layer and updating the Off-screen gesture switch in the driver layer according to the on/off state.

14. The mobile terminal according to claim 12, wherein the method further comprises:
when an updating condition for the confusable gesture group is met, taking a gesture trail of each of Off-screen gestures acquired within a set time length as a sample, and dividing the gesture trail of the sample of the Off-screen gesture into at least two gesture sub-trails by set characteristic points;
for each of the Off-screen gestures, comparing each of the gesture sub-trails of the Off-screen gesture with the gesture sub-trails of remaining ones of the Off-screen gestures, to determine deviations of the gesture sub-trails of the Off-screen gesture relative to the gesture sub-trails of the remaining Off-screen gestures;

for each of the Off-screen gestures, counting the gesture sub-trails that have the deviations smaller than a set deviation threshold value; and updating an original confusable gesture group with a new confusable gesture group that comprises at least two Off-screen gestures, wherein a number of the gesture sub-trails with the deviations smaller than the set deviation threshold value between the at least two Off-screen gestures exceeds a set threshold number.

15. The mobile terminal according to claim 14, wherein the updating condition is that a time for which an Off-screen gesture function is used reaches a preset updating time; or the updating condition is that a number of misrecognition times exceeds a set threshold value for the number of misrecognition times.

16. The mobile terminal according to claim 14, wherein the deviation is a coordinate difference of sampling points between the gesture sub-trails; or the deviation is a number of pixels between the gesture sub-trails.

17. The mobile terminal according to claim 12, wherein the method further comprises:

upon detection of a closing instruction for an application program triggered by the Off-screen gesture, acquiring running time of the application program;

when the running time is less than a set time threshold value, prompting the user to select whether misrecognition occurs;

determining a misrecognition frequency at which one of the Off-screen gestures is misrecognized to be another one of the Off-screen gestures according to selection information input by the user; and updating an original confusable gesture group with a new confusable gesture group, wherein the new confusable gesture group comprises at least two Off-screen gestures between which the misrecognition frequency exceeds a set frequency.

18. The mobile terminal according to claim 12, wherein judging whether to change the recognition condition for the switched-on Off-screen gesture according to the result of the matching comprises:

when the result of the matching indicates that the Off-screen gesture does not belong to any confusable gesture group, or when the result of the matching indicates that at least two Off-screen gestures in the confusable gesture group to which the Off-screen gesture belongs is in an on state, maintaining the recognition condition for the switched-on Off-screen gesture to be unchanged.

19. The mobile terminal according to claim 12, wherein the first recognition condition comprises that a number of pixels between a starting point and a terminal point of the Off-screen gesture does not exceed a first number, and the second recognition condition comprises that the number of pixels between the starting point and the terminal point of an Off-screen gesture does not exceed a second number, wherein the second number is larger than the first number.

20. The mobile terminal according to claim 12, wherein recognizing the gesture type of the Off-screen gesture input by the user according to the second recognition condition comprises:

calculating a gesture trail of the Off-screen gesture in a curve fitting manner according to gesture coordinates corresponding to the Off-screen gesture input by the user;

determining a starting point and a terminal point of the Off-screen gesture, and counting pixels between the starting point and the terminal point; and matching a number of the pixels with the preset second recognition condition, and determining the gesture type corresponding to the Off-screen gesture according to a result of the matching.

\* \* \* \* \*